United States Patent Office 3,351,658
Patented Nov. 7, 1967

3,351,658
AMIDE REACTION PRODUCTS OF AMINO ACID CHELATING COMPOUNDS
Frederick C. Bersworth, 120 Washington St., East Orange, N.J. 07052
No Drawing. Continuation of application Ser. No. 446,120, Apr. 6, 1965. This application Sept. 20, 1966, Ser. No. 580,829
7 Claims. (Cl. 260—534)

This application is a continuation of my application Ser. No. 446,120, filed Apr. 6, 1965, now abandoned which in turn is a continuation-in-part of my applications, Ser. Nos. 88,604 and 88,606 filed Feb. 13, 1961, now abandoned.

This invention relates to a group of amino acid shelating agent compounds and their reaction products when they are reacted with a hydrazine moiety, i.e., hydrazine or a substituted hydrazine.

Synthetic amino acid chelating agents have established their utility in many applications. These range from inhibition of metal ion discoloration in processes such as textile dyeing, printing and papermaking to the control of metal ions in polymerization reactions. Equally important have been the applications of amino acid chelates for control of calcium precipitation in various types of aqueous media. As these applications have become increasingly important so has the need for more selective and potent agents for individual purposes. The present invention concerns an improvement in amino acid chelating agents effected by the preparation of a new series of derivatives of these compounds.

By the methods described in detail in this application I have prepared certain hydrazide derivatives from the class of synthetic amino acid chelating agents. These new compounds have interesting and unexpected chelating properties. In addition, by virtue of the reactive hydrazide groups, they can be converted to novel reaction products with classes of compounds chosen from those with reactive carbonyl groups, with reactive anhydride groupings, with the oxide bridge structure of carbon compounds, and with certain unsaturated materials.

Other objects and advantages of the invention will in part be obvious and in part appear hereinafter.

The chemistry of hydronitrogen compounds is well set forth in Audrieth, "Chemistry of Hydrazine" (John Wiley and Sons, Inc., N.Y., 1951).

The invention, accordingly, is embodied in certain amino acid chelating agent compounds and their reaction products with hydronitrogen compounds whereby the reaction product is characterized by amide type linkages, which products are then further reacted with compounds to form additional derivatives.

The details of the formation of the compounds and the nature of the reaction products, as well as the properties thereof, will be illustrated in detail in the following paragraphs summarizing their properties and also summarizing the manner in which the compounds are synthesized.

Chelating compounds corresponding to the general structure useful for my purposes may be found described in some detail in my issued United States Patents 2,532,391; 2,532,392; 2,428,353; 2,407,645 and similar contemporaneous patents of mine wherein the development of the chelating function of the spaced nitrogen atoms is worked out in detail. These disclosures are incorporated herein.

The alkylene polyamine acetic acid compounds used in making the hydrazine derivatives of the present invention are represented by the following formula:

Wherein $n$ is either 2 or 3; and $m$ is either zero or a positive integer; and $o$ is either zero or a positive integer; and Wherein COM is independently selected from the group consisting of hydrocarbon moieties containing at least one carbon atom and having independently not more than two hydrogen atoms replaced by a member of the group consisting of HN, —COOR, —COOM, —CH$_2$OPO$_2$H, —SO$_2$H, —SO$_3$M, —OR and —OR'OR wherein R is alkyl or hydrogen, M is hydrogen of an ester group and R' is alkylene, said groups being spaced at least two carbon atoms from the nitrogen atoms. Representative compounds are nitrilo triacetic acid; ethylene diamine tetraacetic acid; diethylene triamine pentaacetic acid; tetra ethylene pentaamine hexaacetic acid; the corresponding proprionic acid compounds. These represent the instances where all positions are acid. Corresponding compounds are made when one or more acid groups are replaced by an alkyl or substituted alkyl group. Hydroxyethyl is typical. The substitution should be limited to not more than one substituent per nitrogen of the N - - - N - - - N central chain.

With this kind of chelating structure carrying its 2, 3, 4 or more acid groups I react the hydrazine compound which has the following moiety:

$$H_2N \cdot NHX$$

wherein X is hydrogen, lower alkyl, i.e. up to 6 or 8 carbon atoms, or ·NHX. Representative compounds thus are hydrazine and substituted hydrazines, methyl, ethyl - - - octyl hydrazine, etc. In general, the saturated hydronitrogen compounds and unsaturated hydronitrogen compounds in the homopolymer series of these compounds are useful, though greatest utility is in the first 1, 2, or 3 members of each series.

The resulting molecule corresponding to this invention will have a structure as indicated in the general formulation, the structure being characterized by the fact that it has an acid group reacted with hydrazine, or like hydronitrogen compound.

Ethylene diamine tetraacetic acid reacted with one, two, three and four hydrazines is as follows:

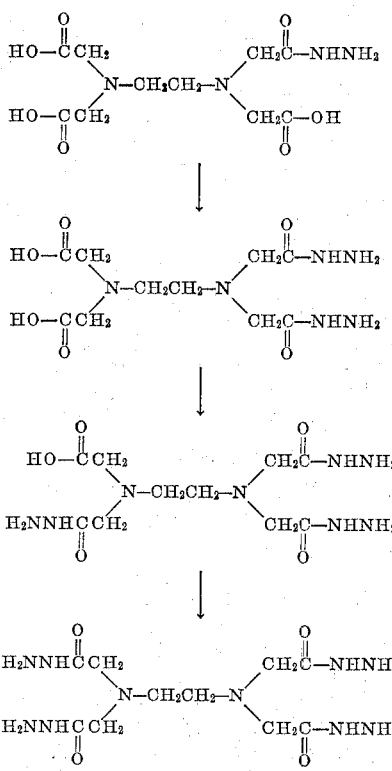

In other words, taking the direct reaction of hydrazine with the chelating agent as typical, reacting only one mole of the acid group of the chelating agent with the hydrazine, is adequate to produce the elementary type structure characterizing my invention; and the complete reaction of the chelating structure with hydrazine will, of course, produce a plurality of moieties of the character described. Thus, for example, the simple direct preparation of compounds corresponding to this invention is carried out by reacting the hydrazine with ethylene diamine tetraacetic acid in the acid form using 1, 2, 3 or 4 moles of hydrazine per mole of ethylene diamine tetraacetic acid. Modifications of these versions of the invention are obtained when the hydrazine derivative is reacted with a metal to form a metal chelate, whether the metal be calcium, magnesium, other bivalent metal or a trivalent metal such as iron. The metal reacts with two or more of the groups of the hydrazine-ethylene diamine tetraacetic acid to form an internal fused ring structure.

That is, the formation of these compounds, wherein the chelating moiety is linked to the hydrazine moiety, not only renders the compounds useful in and of themselves, but also provides a fundamental, very useful structure for the formation of additional chelating agents and polymeric compounds by taking advantage of the reactability of the extra $NH_2$ group of the hydrazine. The chelating agents based on a polyalkylene polyamino polyacetic acid structure, generally carrying the spaced nitrogen structure —N - - - N - - - N - - - N—, wherein the space is a 2, 3 or 4 carbon alkylene group and the nitrogen carries acetic or propionic acid may be used in place of ethylene diamine tetraacetic acid.

The simple reaction product of ethylene diamine tetraacetic acid and the hydrazine, which may be considered the simple type compound of this family, gives a crystalline material readily isolated and identified, which in and of itself is useful as a soldering flux and oxygen scavenger in situations of the kind calling for the cleaning of metal and the like.

The tetra methyl ester of EDTA is readily converted to the hydrazide by the procedure described in Example VI herein. The hydrazide formed was characterized by infrared studies and by reaction with a series of compounds.

A more detailed understanding of the structure of the compounds, the properties and the methods of preparation can be had by reference to the following examples.

Preparation of the ester:

EXAMPLE I

EDTA tetramethylester sulfate $(H_3COOCCH_2)_2NCH_2CH_2N(CH_2COOCH_3)_2 \cdot 2H_2SO_4$
M.W. 544.53

One kilogram (3.42 moles) EDTA was stirred in 15 liters methanol while 1.5 kilograms (815 milliliters) concentrated sulfuric acid was added in a thin stream. The mixture was then refluxed for 4 hours. After about half the solvent had been evaporated at suction the residue was chilled to crystallize. The product was collected and washed thoroughly with methanol. Yield 1831 g. (98%).

EDTA tetramethylester free base $(H_3COOCCH_2)_2NCH_2CH_2N(CH_2COOCH_3)_2$
M.W. 348.35

A solution was prepared from 544.5 grams (1.0 mole) EDTA tetramethylester sulfate 1.2 liters water. To this was added gradually with stirring sufficient sodium bicarbonate to produce a basic reaction (170 grams, 2.02 moles). The oil which separated was extracted three times with ether. The organic layer was dried and evaporated to yield 140 grams (40%) of a thin oil.

Purification and analysis give the following for EDTA tetramethyl ester, molecular weight 348.35.

Calc.: C, 48.26; H, 6.94; N, 8.04. Found: C, 48.42; H, 7.25; N, 8.25.

EXAMPLE II

Preparation of the ester of hydroxyethyl ethylene diamine triacetic acid 50 grams of hydroxy ethyl, ethylene diamine triacetic acid were suspended in 2 liters of methanol, 20 milliliters of concentrated sulfuric acid added slowly and the mixture refluxed for four hours. After concentration by distillation in vacuo, one liter of benzene was added to the residue and the mixture refluxed using a Dean-Stark tube to remove any moisture formed in the benzene azeotrope. When the refluxing benzene distilled clear, the solution was concentrated and the esterification repeated with a fresh batch of sulfuric acid and methanol. After four hours of reflux, the methanol was removed by vacuum distillation and the residue cooled. The ester was then recovered by overlayering the residue with ether, adding ice and concentrated potassium carbonate solution, removal of the ether layer, drying with sodium sulfate, filtration and concentration. The residue from this ether extraction yielded 20 grams of ester. A second extraction of the carbonate suspension with ethyl acetate drying and concentration of the ethyl acetate provided an added 5 grams of ester. The product was a viscous oil like the EDTA methyl ester.

EXAMPLE III

The same procedure as described above yielded the diethylene triamine pentaacetic acid methyl ester as a viscous gum.

EXAMPLE IV

The EDTA sulfate was converted to amino acid ester in the following manner: 100 grams of crystalline EDTA sulfate was suspended in 50 milliliters of water and ice and overlayered with 500 milliliters of ether. A saturated aqueous solution of potassium carbonate was added to the mixture until the reaction was strongly alkaline to litmus. The mixture was vigorously shaken to extract the ester into the ether layer. The bottom carbonate layer was withdrawn and the ether layer concentrated to dryness in vacuo in a water bath. The residue was 51 grams of viscous oil of ester, or 67% of theory.

EXAMPLE V

Esterification using hydrogen chloride

The ethylene diamine tetraacetic acid was suspended in methanol as in the sulfuric acid run of Example II. Hydrogen chloride was bubbled into the mixture while the solution was maintained at reflux. The ethylene diamine tetraacetic acid rapidly dissolved. After two hours the heating and acid addition was discontinued and the solution concentrated by vacuum distillation from a steam pot. The residue was a non-crystalline viscous oil. By the identical procedure described above for the ester sulfate, the ester hydrochloride was converted to the ethylene diamine tetraacetic acid tetramethyl ester.

It should be noted from these typical preparative examples that the conditions are essentially anhydrous, to give as a product a dry anhydrous form of ester or partial ester as the reactant for further preparations.

Preparation of the hydrazides:

EXAMPLE VI

Ethylene diamine tetraacetic acid tetra hydrazide

A solution of 20 grams of ethylene diamine tetraacetic acid tetramethyl ester described above and 20 milliliters of 99% hydrazine was refluxed in 100 milliliters of methanol for two hours. During this time the solution became turbid with separation of an oily phase. The mixture was concentrated to about 30 milliliters and allowed to cool overnight. The viscous gum which settled was obtained by decantation from the supernatant liquor. On trituration with ice water the gum crystallized and could then be recrystallized from water or from 50% ethanol. The white crystalline product melted at 98° to 100° C.

Analysis gave the following:

Calc.: C, 32.78; H, 7.15; N, 38.23. (I) Found: C, 31.64; H, 7.42; N, 33.09. (II) Found: C, 33.44; H, 7.22; N, 38.70.

Calculated value is based on EDTA hydrazide monohydrate $C_{10}H_{26}N_{10}O_5$, mol. wt. 366.39.

EXAMPLE VII

The product of Examples II and III were reacted with hydrazine as in the case of the EDTA ester. The isolation of the hydrazide as a crystalline material is not necessary.

The tetrahydrazide of the ethylene diamine tetraacetic acid has the following properties:

Soluble hot water, hot methanol; insoluble in butanol, benzene, acetone, ethyl ether, ethyl acetate; deep red solution with ferric chloride, red solution with cobalt ion, green yellow solution with nickel ion, green solution with copper ion. The indicated structure is

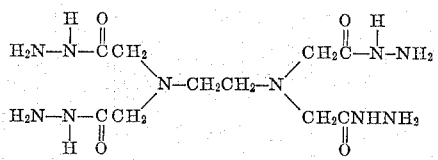

The product is soluble in water; insoluble in methanol, ethyl acetate, cold acetone.

I have found this compound to be the tetrahydrazide derivative as follows:

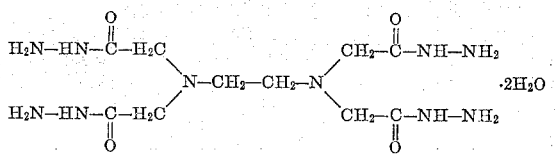

Analytical data and infrared spectral measurements are in agreement.

The analytical data are as follows:

|   | Theory | | Reported |
|---|---|---|---|
|   | Di-imide | Tetrahydrazide dihydrate |   |
| C | 42.25 | 31.25 | 31.82, 32.01 |
| H | 5.63 | 7.29 | 7.83, 7.76 |
| N | 29.58 | 36.46 | 36.78, 36.83, 36.43 |

Recrystallization from methanol yielded the tetrahydrazide monomethanolate. The analytical data are given below.

Theory: C, 34.73; H, 7.37; N, 36.84. Reported: C, 34.41, 34.41; H, 7.56, 7.76; N, 36.46, 36.43.

It has been established that both the ferrous and ferric ions complex with this ligand species. Though the structure of the complexes was not obtained, several important characteristics of these complexes were noted. First, both the ferrous and ferric species are exceptionally soluble in water over a wide pH range (3 to 13). It should be noted that no iron oxide precipitated from a solution of 1 gram of complex in 25 milliliters of water over the aforementioned pH range. Second, a continuous variation study involving the visible spectra of the ferric derivative uncovered an involved reaction mechanism of complexation. Immediately upon mixing the ferric ion with a ligand solution, a complex form which has a 2 to 1 stoichiometry. However, after a twenty-four hour period, there is an apparent transformation to a 1 to 1 stoichiometry.

Conductivity measurements did little to assist in the elucidation of the structures of the complexes. The molar conductances are listed in the table. There is an appreciable drop in the conductance values of the complexes as compared to the analagous metal chloride. This is contrary to the expected behavior because the ionic mobility decreases with the size of the ions and, if we assume that the molar conductance is an additive feature of the ionic conductance (Kohlrausch's law), then it is to be expected that the larger molecule would show an increase in conductance as compared to the smaller one. However, the behavior that was noted was the reverse. That is to say, there is a decrease in conductance as we go from the iron chloride to the iron complex.

Table.—Molar conductance value of $10^{-3}$ aqueous solution of the complexes at 22.5°

| Compound: | Molar conductance |
|---|---|
| KCl | 155 |
| $FeCl_2$ | 244 |
| $FeCl_3$ | 635 |
| $FeCl_2$+ligand | 141 |
| $FeCl_3$+ligand | 400 |

KCl is a uni-uni, $FeCl_2$ a di-uni, and $FeCl_3$ a typical tri-uni electrolyte.

Qualitatively the properties of EDTA hydrazide are that it is soluble in water and in hot ethanol, insoluble in butanol, benzene, acetone, ethyl ether, ethyl acetate and forms a deep red solution with ferric chloride, a red solution with cobalt ion, and a green yellow solution with nickel ion.

EXAMPLE VIII $(H_2NNHCOCH_2)_2NCH_2CH_2N(CH_2CONHNH_2)_2$,
M.W. 348.37

To 502 grams (1.15 mole) EDTA tetramethylester free base was added, dropwise, with stirring, and at room temperature 346 grams (6.9 moles, 1.5× excess) 100% hydrazine hydrate. After the mild exothermic reaction was over the mixture was stirred at about 45° for four more hours. After cooling and seeding the product was collected and washed thoroughly with methanol. Yield 375 grams (93%), M.P. 98°. A portion was recrystallized from 90% methanol, M.P. 99–100°.

EXAMPLE IX $(Me_2NNHCOCH_2)_2NCH_2CH_2N(CH_2CONHNMe_2)_2$,
M.W. 460.58

A solution of 50 grams (0.143 mole) EDTA tetramethylester free base (prepared as described previously), 43 grams dimethyl hydrazine (0.715 mole, 1.25× excess) and 200 milliliters methanol was refluxed for four hours. The volatile liquids were eliminated at suction and the thick oil was induced to crystallize in the freezer. The very low melting crystals were collected, sucked dry and rinsed well with ether and hexane. Yield 46 grams (70%). A sample was recrystallized from ether-hexane. M.P. 30–31°.

The EDTA hydrazide so prepared, M.P. 95–97°, was analyzed. Some difficulty is encountered in purifying it, but nitrogen analysis for the formula is—

$C_{10}H_{16}O_4N_6$: 33.1% found; 29.6% calculated

It is observable that the EDTA hydrazide as the type compound forms extraordinarily stable chelates with iron. Such chelates have been formed and stored at pH 12, in solution for 12 months without precipitation. Because of the strong interaction with ferric ion, I deduce the following reaction occurs between the ferric ion and each hydrazide group in the molecule

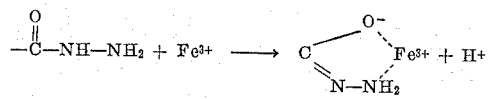

Thus the strong Fe(III) binding porperties of EDTA tetrahydrazide are due to the fact that it has four such groups in the molecule as indicated by the following formula:

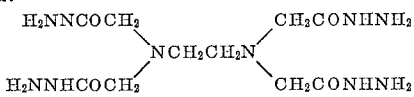

It is also clear that this is a new compound and completely different from the tetrahydrazide salt of EDTA, described in British Patent No. 781,491. The latter compound has four quaternary (positively charged) nitrogen atoms, and has the following structure.

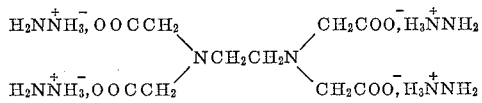

The hydrazine derivatives thus prepared in accordance with this invention are characterized by the presence of a group formulated thus:

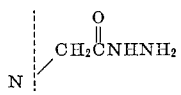

which, it will be noted, includes an amino amide group. That is, the hydrazine is united to the carboxymethyl group through a nitrogen. This leaves an $NH_2$ group termination and permits the further elaboration of the compound through carboxymethylation.

It should also be noted further that these compounds are complex amino acid compounds and, in accordance with the principles of my parent application, they are useful for their reaction with acrylic compounds for the formation of gells. That is, the reaction with the acrylic compounds is based upon a dual activity of this type of compound, particularly notable with the complicated acid structure. The acid forms a free radical complex with the acrylic compound and, at the same time, forms a reaction product with it, wherein with the vinyl polymerization induced by the free radical, there is still obtained an acid substituted polymer carrying enough of these acid groups to provide reaction sites for additional compounds.

The closest art known to applicant relating to the new compounds described herein is as follows:

British Patent 836,332
British Patent 781,491
Noller, Chemistry of Organic Compounds, 2nd edition, page 244, W. B. Saunders Co., Philadelphia (1957). QD 253. N65.
United States Patent 2,805,203, Knapp Wagner et al., "Synthetic Organic Chemistry," pages 566–569 (1953) (QD 262 W24).
Audrieth, "Chemistry of Hydrazine," John Wiley & Sons, Inc., New York (1951).

The hydrazides of chelating agents greatly improve the stability of chelates over a wide pH range including alkaline pH range. The $Fe^3$ chelates of EDTA dihydrazides. Tetrahydrazides, hydrazide derivatives of hydroxyethyl— tricarboxymethyl analogues are of deep purple to deep red in color and samples of such chelate solutions I have found are stable in alkaline solution for a period of 9 months, and more, and show no precipitation. The hydrazides of EDTA will dissolve magnetic iron oxide dust at any pH. For example, at pH of 7 this dust will dissolve and form a deep red solution within a few hours at room temperature. The ferric chelate is soluble in methanol and very soluble in aqueous methanol, producing an 80+% solution.

The chelating agent (hydrazide) as well as the preformed chelates are adherant to plastics, substantive to fibres. For example, the $Fe^3$ chelate incorporated on a petri dish will adhere and cannot be washed off with water or alcohol.

A feeding test indicates that the chelating hydrazide goes through the gut, when compared to Penicillin amine.

The basis for this unexpected and useful chelation effect may be postulated as follows:

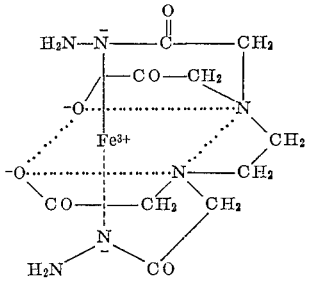

Such structure finds uses in catalysis, pharmacology, chemotherapy, and industrial application in form of Schiff bases of various aldehydes; or in form of porphorine; and in agriculture. This invention and experiments made indicate that this type of structure may be used in place of the more expensive Schiff bases and as porphorine structure.

Numerous methods of forming amides are known, for example, one mol of acid may be reacted with one or more mols of hydrazine of temperature sufficient to liberate $H_2O$ with or without solvent. Acid chloride may be reacted with an amine as in this case hydrazine or substituted hydrazine. I prefer to use esters of the chelating acids. The methyl ester is of choice. It is well understood, easily produced and, more important, most economical. It may be produced in accordance with my Patent No. 2,532,292, and ester sulfate disclosed therein neutralized with base and the free ester used to produce the products of this invention.

Production of disproportioned esters and the hydrazide derivatives thereof:

It was found that the normal ester sulfates of carboxy methyl EDTA type amino acids will disolve (in methanol) additional amounts of the respective acids. For example, a typical esterification recipe is as follows:

EDTA _____ grams__ 14
Methanol _____ milliliters__ 350
$H_2SO_4$ (96%) _____ grams__ 16.66

Heat to reflux for period of 4 hours outstanding. The tetra ester sulfate crystalizes. However, now redissolve in 200 milliliters additional methanol and then add at increments additional amounts of EDTA. 38+ grams of EDTA can be dissolved in this solution. The ratio now is:

EDTA _____ grams__ 52
Methanol _____ milliliters__ 550
$H_2SO_4$ (96%) _____ grams__ 16.66

It is a clear solution at this point. Methanol may be distilled off without difficulty. Other amino acids may be treated in the same way as the following table will show:

EDTA T M. ester sulfate normal 1 mole above 3.4 mole
HEDTA Tri M. ester sulfate normal 1 mole above 4.2 mole
EETPA M. ester sulfate normal 1 mole above 4.6 mole
Cyclohexyl M. ester sulfate normal 1 mole above 5.2 mole The disproportioned esters are not easily isolated as the free base. One may, however, react them as produced as follows: Hydrazine is added to the ester sulfate solution in methanol acid and then carefully neutralized with sodium methoxide in methanol. Temperature is preferably kept at below 50° C. The soduim sulfate may be filtered, leaving a solution of the formed hydrazides in methanol. Filtration of the products show the presence of carboxylic acid. This will vary with the amino acids used. No definite analysis has been made.

The products do complex $Fe^3$ to form the typical sodium complex solutions and one more stable than the $Fe^3$ chelates of the starting materials. The products may have from 1 to any number of hydrazide molecules as well as some salts of hydrazine. However, excess of hydrazine in form of salt may be removed by saturating the reaction solution with $CO_2$ when hydrazine carbonate will precipitate in the form of a gum. The hydrazides may be decanted.

One specific and typical difference between the amino acids per se, the hydrazine or other salt is, that the hydrazides are sweet to the taste. The taste may be said to be in proportion to the hydrazides groups present. The mono slightly acid, the di less and the tri and tetra are quite sweet.

An approach to the mechanism of this chelation can be stated rationally as follows:

An amide (or alkyl amide) does not react appreciably with the ferric ion.

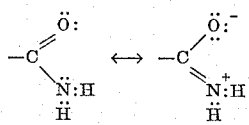

Here the resonance interaction of the $-NH_2$ and carbonyl groups are such as to greatly reduce the basicity of the nitrogen so that it is not effective as a donor for coordination of metal ions. However, the basicity is not sufficiently reduced to allow the metal ion to displace a proton from the amide nitrogen, so that the amide group cannot function as a negative donor.

If an electronegative atom is attached to the amide nitrogen, the basicity of the nitrogen atom is reduced still further so that it becomes a very weak acid. Under these conditions it may even lose a proton in strongly alkaline solution (although it may not in the absence of metal ions, and this characteristic is not required for the group to be effective when metal ions are present). The essential difference is that in the presence of a metal ion, such as the $Fe^{3+}$ ion, the group does lose a proton and becomes transformed to a negative donor group, which is then a very strong complexing group for metal ions.

*Metal-hydrazide coordination.*—Thus a hydrazide may be considered to be an amino-substituted amide, so that the amide group may dissociate a proton in the presence of a metal ion, as follows.

Free hydrazide:

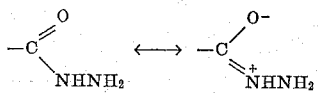

Metal-hydrazide complex ($ML^{n-1}+H^+$):

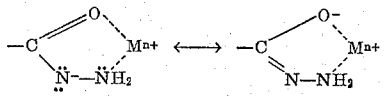

*Acyl ureas.*—An acyl urea prepared by the condensation of a carboxyl group with urea, may be considered to have the following structure.

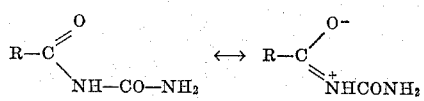

In this case the electron-withdrawing carbonyl group adjacent to the amide nitrogen would make possible the dissociation of a proton in the presence of a positive metal ion, so that we would have:

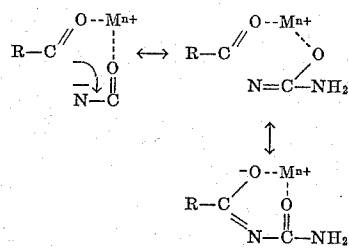

Here combination with the urea oxygen is considered more likely than with the amide nitrogen, for steric reasons.

*Guanides.*—The guanide of a carboxylic acid may be considered analogous to an acyl urea, with an electronegative (electron-withdrawing) imine group adjacent to the amide nitrogen:

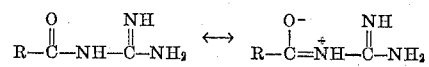

basic form of guanide

In the presence of a metal ion, a proton would be dissociated from the metal ion to give a structure such as the following:

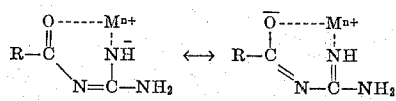

Thus it is seen that complexing by all of these groups can be rationalized. It should be pointed out, however, that considerable specificity must exist between these groups and the metal ion that is complexed. They are apparently not electron-withdrawing enough to dissociate protons and become coordinating ligands in the presence of mono and divalent metal ions. However, a trivalent ion, such as $Fe^{3+}$, apparently has sufficient polarizing power to give the structures illustrated above. Therefore in a mixture of $Fe^{3+}$ ions, and ions of lower charge, these compounds would be specific for iron.

Presumably some metal ions of $+3$ or higher charge could also be complexed and sequestered in aqueous solution by these reagents.

The reactions with mono and di halides may be summarized as follows:

The production of monomers→polymers and copolymers. These are useful as homo polymers per se or as copolymers in film and fiber production largely because of the linear structure which can be so induced, and of course wherever a linear structure exists the polymer can be represented:

For example:

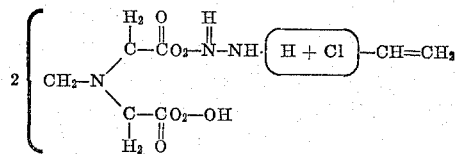

The various long chain di acids, azelaic acid, etc. form the amide (nylon) analogue.

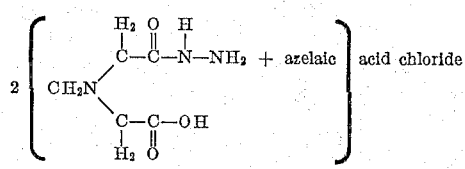

This type structure is useful in the production of polyamide polymers, i.e., the nylon type.

The di hydrazide can be reduced to form

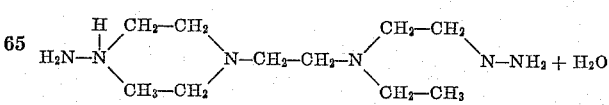

a completely saturated new polyamine.

The hydrazides also include an ethylenediamine moiety in a very interesting relationship with others, thereby, per se and as an intermediate being useful to form diamine derivatives. It is useful with polymers, for example chloro acids, specifically long chain di acids to form fibers, or the compound may be considered as oxygen $O_2$–CO reactant in place of diamines normally used in fiber production.

This differs from the presently established bis keto (en) piperazine, but there are certain reaction similarities in both. For example, in both cases the ethylene bridge nitrogens are aliphatic. They will accept copper and other transition metals to form complexes. They may also be quaternized as such and used in the formation of polymers.

In the equations representing the reactions, for purposes of simplicity, 1:1 molar quantities were used. It is to be understood, however, that, in general, the reaction proceeds with equal facility for reacting two mols of the nitrogen compound with 1 mole of the chelating agent. Where the reaction is carried to the addition of a third or fourth mole of the nitrogen nucleus to the chelating agent, reaction proceeds with some difficulty, if at all. Accordingly, in the sequence of reactions, though they are described in terms essentially of 1:1 molar quantities, it is to be understood that the examples are directly applicable to reaction between 1 mol of the chelating agent acid and 2 mols of the indicated nitrogen compound.

In the reaction often carbonates are used for guanidine, amino guanidine, etc. They are easy to react with compounds (chelating agents) to form valuable compositions in which one or the other may be present in excess if it is desired. They react in water—and may be simply boiled down. They may be mixed with a small amount of water, hot preferred, or with steam. They are useful with any amino acetic acid or polyamino, polyacetic acid.

The general method of synthesis preferred for the reaction of any of the acids or salts of ethylene diamine tetraacetic acid and related compounds with the hydrazine, guanidine, or urea, or the like, is in the form of a fusion. These compounds melt at clearly defined temperatures which are not so high as to render handling difficult. By reacting them in a melt, a truly anhydrous medium is assured to produce the amide by the dehydration-condensation reaction sought. Thus, in accordance with the following tabulation, nitrilo triacetic acid, ethylene diamine tetraacetic acid, diethylene triamine pentaacetic acid, penta ethylene hexamine heptaacetic acid, and so forth are heated in the form of the acid of the sodium salt or other alkali metal salts with the nitrogen compound such as hydrazine to the removal of water to produce the amide condensation product.

Analysis gave the following:

Calc.: C, 32.78; H, 7.15; N, 38.23. (I) Found: C, 31.64; H, 7.42; N, 33.09. (II) Found: C, 33.44; H, 7.22; N, 38.70.

Calculated value is based on EDTA hydrazide monohydrate $C_{10}H_{26}N_{10}O_5$, mol. wt. 366.39.

The salicylaldehyde Schiff base will form a very stable chelate with $Fe^{3+}$, in which the metal ion is bound to a phenolate oxygen in addition to the basic nitrogen derived from the hydrazide function, and the amino acid carboxylate groups of EDTA.

What is claimed is:

1. The reaction product of a compound having a formula given by:

wherein,
R is

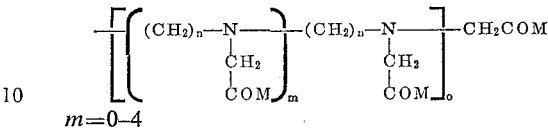

$m = 0-4$
$o = 0,1$
$n = 2,3$ and —COM is independently selected from the group consisting of —COOH, —COONa, —COOK,

—COONH$_4$ and C—O—O-alkyl, not more than two COM's being —CH$_2$OH, with a compound selected from the group consisting of hydrazine, alkyl substituted hydrazines having 1–8 carbon atoms, guanidine, and urea, wherein at least one of said —COM's is reacted, said reaction being conducted under conditions wherein the reactants are freed of water, the conditions being such that water is liberated in the reaction, the reaction being conducted at a temperature sufficient to eliminate water of reaction with acid forms and alcohol of reaction with ester forms.

2. A composition in accordance with claim 1 which is the product of reaction of one mole of ethylene diamine tetra acetic acid and two moles of hydrazine.

3. A composition in accordance with claim 1 which is the product of reaction of one mole of hydroxy ethyl ethylene diamine triacetic acid and one mole of hydrazine.

4. A composition in accordance with claim 1 which is the product of reaction of one mole of hydroxy ethyl ethylene diamine triacetic acid and two moles of hydrazine.

5. The mono amide of hydrazine and ethylene diamine tetraacetic acid.

6. The tri amide of hydrazine and ethylene diamine tetraacetic acid.

7. The tetra amide of hydrazine and ethylene diamine tetraacetic acid.

References Cited

UNITED STATES PATENTS 2,805,203  9/1957  Knapp _____ 260—534 X

FOREIGN PATENTS 712,065  7/1954  Great Britain.
781,491  8/1957  Great Britain.
836,332  6/1960  Great Britain.

OTHER REFERENCES

Noller: Chemistry of Organic Compounds, 2nd edition, page 244, W. B. Saunders Company, Philadelphia, Pa. (1957).

RICHARD K. JACKSON, *Primary Examiner.*

A. P. HALLUIN, *Assistant Examiner.*